United States Patent

Huang

(10) Patent No.: US 8,351,227 B2
(45) Date of Patent: Jan. 8, 2013

(54) SWITCHING CONTROLLER FOR POWER CONVERTERS

(75) Inventor: Wei-Hsuan Huang, Taoyuan County (TW)

(73) Assignee: System General Corp., Taipei Hsien (TW)

(*) Notice: Subject to any disclaimer, the term of this patent is extended or adjusted under 35 U.S.C. 154(b) by 196 days.

(21) Appl. No.: 12/720,114

(22) Filed: Mar. 9, 2010

(65) Prior Publication Data
US 2011/0182090 A1 Jul. 28, 2011

Related U.S. Application Data

(60) Provisional application No. 61/336,497, filed on Jan. 22, 2010.

(51) Int. Cl.
*H02M 3/335* (2006.01)
*G05F 1/575* (2006.01)
(52) U.S. Cl. ............ 363/56.1; 363/21.17; 323/284; 323/285
(58) Field of Classification Search ............ 363/20, 363/21.01, 21.04, 21.09, 21.1, 21.12, 21.17, 363/12.18, 97, 56.09, 56.1; 323/284, 285
See application file for complete search history.

(56) References Cited

U.S. PATENT DOCUMENTS 7,239,119 B2 * 7/2007 Baurle et al. .......... 323/284
7,652,463 B2 * 1/2010 Lin et al. .......... 323/288

* cited by examiner

*Primary Examiner* — Gary L Laxton
(74) *Attorney, Agent, or Firm* — Rosenberg, Klein & Lee

(57) ABSTRACT

A switching controller for power converter comprises a current-sense circuit and a PWM circuit. The current-sense circuit receives high-voltage signal across a first switch to generate a current-sense signal. The PWM circuit generates a switching signal to control the first switch in response to the current-sense signal. The switching controller further comprises a delay circuit. The delay circuit receives the switching signal to generate a delayed switching signal. The current-sense signal and the high-voltage signal ramp up with the same slope during the delayed switching signal is enabled. The current-sense signal will be pulled down to a level of a ground reference during the delayed switching signal is disabled. A delay time provided by the delay circuit avoids the high-voltage signal at the instance which the first switch is being turned off being conducted to a first comparator and a second comparator via a second switch.

15 Claims, 4 Drawing Sheets

SWITCHING CONTROLLER FOR POWER CONVERTERS

BACKGROUND OF THE INVENTION

1. Field the Invention

The present invention relates to a power converter, and more specifically, relates to a switching controller of the power converter.

2. Description of the Related Art

A switching controller of a power converter is utilized to regulate an output voltage from an unregulated input voltage. In conventional power converters, a current-sense resistor is generally connected in series with a power switch to generate a voltage representative of a switching current flowing through the power switch. However, this current-sense resistor causes inevitable power consumption, which reduces the efficiency of the power converter under light-load conditions.

FIG. 1 shows a conventional power converter. The power converter comprises a switching controller 50, a transistor 20, a transformer 10, diodes 11 and 21, capacitors 12 and 22 and a secondary feedback circuit 16. The switching controller 50 comprises a PWM circuit 30 (PWM) and comparators 31 and 32. The transistor 20 is a high-voltage device, which is, for example, the power switch as aforementioned.

The transformer 10 includes a primary winding $N_P$, an auxiliary winding $N_A$ and a secondary winding $N_S$. A first terminal of the primary winding $N_P$ is supplied with an input voltage $V_{IN}$. A second terminal of the primary winding $N_P$ is connected to a drain of the transistor 20. A drain voltage $V_D$, which is a high-voltage signal, is obtained at a joint of the second terminal of the primary winding $N_P$ and the drain of the transistor 20. A current-sense resistor 25 is connected between a source of the transistor 20 and a primary ground reference. A second terminal of the secondary winding $N_S$ is connected to an anode of the diode 11. A first terminal of the secondary winding $N_S$ is connected to a secondary ground reference. The capacitor 12 is connected between a cathode of the diode 11 and the first terminal of the secondary winding $N_S$. The output voltage $V_O$ is obtained across the capacitor 12.

A first terminal of the auxiliary winding $N_A$ is connected to the primary ground reference. A second terminal of the auxiliary winding $N_A$ is connected to an anode of the diode 21. The capacitor 22 is connected between a cathode of the diode 21 and the primary ground reference. A supply voltage $V_{CC}$ is obtained across the capacitor 22 to power the switching controller 50.

The secondary feedback circuit 16 comprises a resistor 13, a zener diode 14, and an opto-coupler 15. A first terminal of the resistor 13 receives the output voltage $V_O$. A second terminal of the resistor 13 is connected to a cathode of the zener diode 14. An anode of the zener diode 14 is connected to an input of the opto-coupler 15. A first terminal of a resistor 33 receives the supply voltage $V_{CC}$. A second terminal of the resistor 33 is connected to an output of the opto-coupler 15. Therefore, the output of the opto-coupler 1$ is pulled high by the resistor 33. A feedback signal $V_{FB}$ is generated at the output of the opto-coupler 15 in response to the output voltage $V_O$ of the power converter.

The current-sense resistor 25 converts a switching current $I_P$ flowing through the transistor 20 into a current-sense signal $V_{CS}$. The current-sense signal $V_{CS}$ and a current-limit threshold $V_{LMT}$ are respectively supplied to a negative terminal and a positive terminal of the comparator 31. The current-limit threshold $V_{LMT}$ is utilized to limit a maximum of the switching current $I_P$. Once the current-sense signal $V_{CS}$ exceeds the current-limit threshold $V_{LMT}$, the comparator 31 will generate a first signal $S_{OC}$ to the PWM circuit 30. The feedback signal $V_{FB}$ and the current-sense signal $V_{CS}$ are respectively supplied to a positive terminal and a negative terminal of the comparator 32. Once the current-sense signal $V_{CS}$ exceeds the feedback signal $V_{FB}$, the comparator 32 will generate a second signal $S_{RG}$ to the PWM circuit 30. The PWM circuit 30 therefore generates a switching signal $S_{PWM}$ to drive the transistor 20 in response to the first signal $S_{OC}$ and the second signal $S_{RG}$.

FIG. 2 shows the PWM circuit 30 of the conventional power converter in FIG. 1. The PWM circuit 30 comprises an oscillator 301 (OSC) an inverter 302, a flip-flop 303, an AND gate 304, NAND gates 305 and 306, and a blanking circuit 307 (BNK). An output of the oscillator 301 generates a pulsating signal PLS, which is supplied to a clock input terminal ck of the flip-flop 303 for enabling the switching signal $S_{PWM}$ via the inverter 302. An output terminal Q of the flip-flop 303 is connected to a first input terminal of the AND gate 304. An output of the inverter 302 is connected to a second input terminal of the AND gate 304. An output terminal of the AND gate 304 generates the switching signal $S_{PWM}$. An input terminal D of the flip-flop 303 is supplied with the supply voltage $V_{CC}$. The first signal $S_{OC}$ and the second signal $S_{RG}$ are both supplied to input terminals of the NAND gate 305. An output terminal of the NAND gate 305 is connected to a first input terminal of the NAND gate 306. Once the switching signal $S_{PWM}$ received at an input terminal of the blanking circuit 307 becomes logic-high, an output terminal of the blanking circuit 307 will output a short logic-low pulse to a second input terminal of the NAND gate 306. An output terminal of the NAND gate 306 is connected to a reset terminal R of the flip-flop 303 to reset the flip-flop 303.

FIG. 3 shows key waveforms of the conventional power converter in FIG. 1. When the switching signal $S_{PWM}$ is disabled, the transistor 20 will be turned off. The current-sense signal $V_{CS}$ is therefore pulled down to a level of the primary ground reference, which equals to 0 volt. Since the primary winding $N_P$ is supplied with the input voltage $V_{IN}$, the level of the drain voltage $V_D$ is substantially equal to that of the input voltage $V_{IN}$ when the transistor 20 is turned off.

When the switching signal $S_{PWM}$ is enabled, the transistor 20 will be turned on. The drain voltage $V_D$ is pulled down to a voltage level $V_{D1}$ and the current-sense signal $V_{CS}$ equals to a voltage level $V_1$. The voltage levels $V_{D1}$ and $V_1$ can be expressed by:

$$V_{D1}=I_{P1}\times(R_{DSON}+R_{25}) \qquad (1)$$

$$V_1=I_{P1}\times R_{25} \qquad (2)$$

Where $I_{P1}$ is an initial value of the switching current $I_P$ flowing through the transistor 20 as the switching signal $S_{PWM}$ is just enabled; $R_{25}$ is the resistance of the current-sense resistor 25; and $R_{DSON}$ is the on-resistance of the transistor 20.

Meanwhile, the input voltage $V_{IN}$ will start to energize the primary winding $N_P$, which causes the drain voltage $V_D$ to ramp up with a first slope. It is noted that the current-sense signal $V_{CS}$ will also ramp up with a second slope which is equal to the first slope.

Whether the current-sense signal $V_{CS}$ exceeds the current-limit threshold $V_{LMT}$ or the feedback signal $V_{FB}$, the flip-flop 303 (shown in FIG. 2) will be reset and therefore disables the switching signal $S_{PWM}$. This will accordingly turns off the transistor 20. The drain voltage $V_D$ will be pulled up to the level of the input voltage $V_{IN}$ and the current-sense signal $V_{CS}$ will be pulled down to the level of the primary ground reference again.

SUMMARY OF THE INVENTION

A switching controller for a power converter comprises a current-sense circuit and a PWM circuit. The current-sense circuit receives a high-voltage signal across a first switch to generate a current-sense signal. The current-sense signal is representative of a switching current flowing through the first switch. The PWM circuit generates a switching signal in response to the current-sense signal. The switching controller further comprises a first comparator, a second comparator and a delay circuit. The first comparator receives a current-limit threshold and the current-sense signal for generating a first signal when the current-sense signal exceeds the current-limit threshold. The current-limit threshold is utilized to limit a maximum of the switching current flowing through the first switch.

The second comparator receives a feedback signal and the current-sense signal. The second comparator generates a second signal when the current-sense signal exceeds the feedback signal. The feedback signal is correlated to an output voltage of the power converter. The PWM circuit is coupled to the first comparator and the second comparator for generating the switching signal in response to the first signal and the second signal. The delay circuit receives the switching signal to generate a delayed switching signal. The switching signal drives a control terminal of the first switch.

The current-sense circuit comprises a second switch, a third switch and an inverter. The second switch is coupled to the first switch for receiving the high-voltage signal. A control terminal of the second switch is driven by the delayed switching signal. The third switch is coupled to the second switch, the first comparator and the second comparator. The inverter receives the delayed switching signal for controlling a control terminal of the third switch. According to an embodiment of the present invention, the first switch and the second switch are high-voltage transistors.

The current-sense signal and the high-voltage signal ramp up with the same slope during the delayed switching signal is enabled. The third switch will be turned on to pull down the current-sense signal to a level of a ground reference during the delayed switching signal is disabled. A delay time provided by the delay circuit avoids the high-voltage signal at the instance which the first switch is being turned off being conducted into the first comparator and the second comparator via the second switch.

It is an objective of the present invention to eliminate the need of a current-sense resistor connected in series with a power switch to reduce the manufacturing cost.

It is another objective of the present invention to reduce the power consumption of the power converter under light-load conditions.

It is another objective of the present invention to improve the efficiency of the power converter under light-load conditions.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
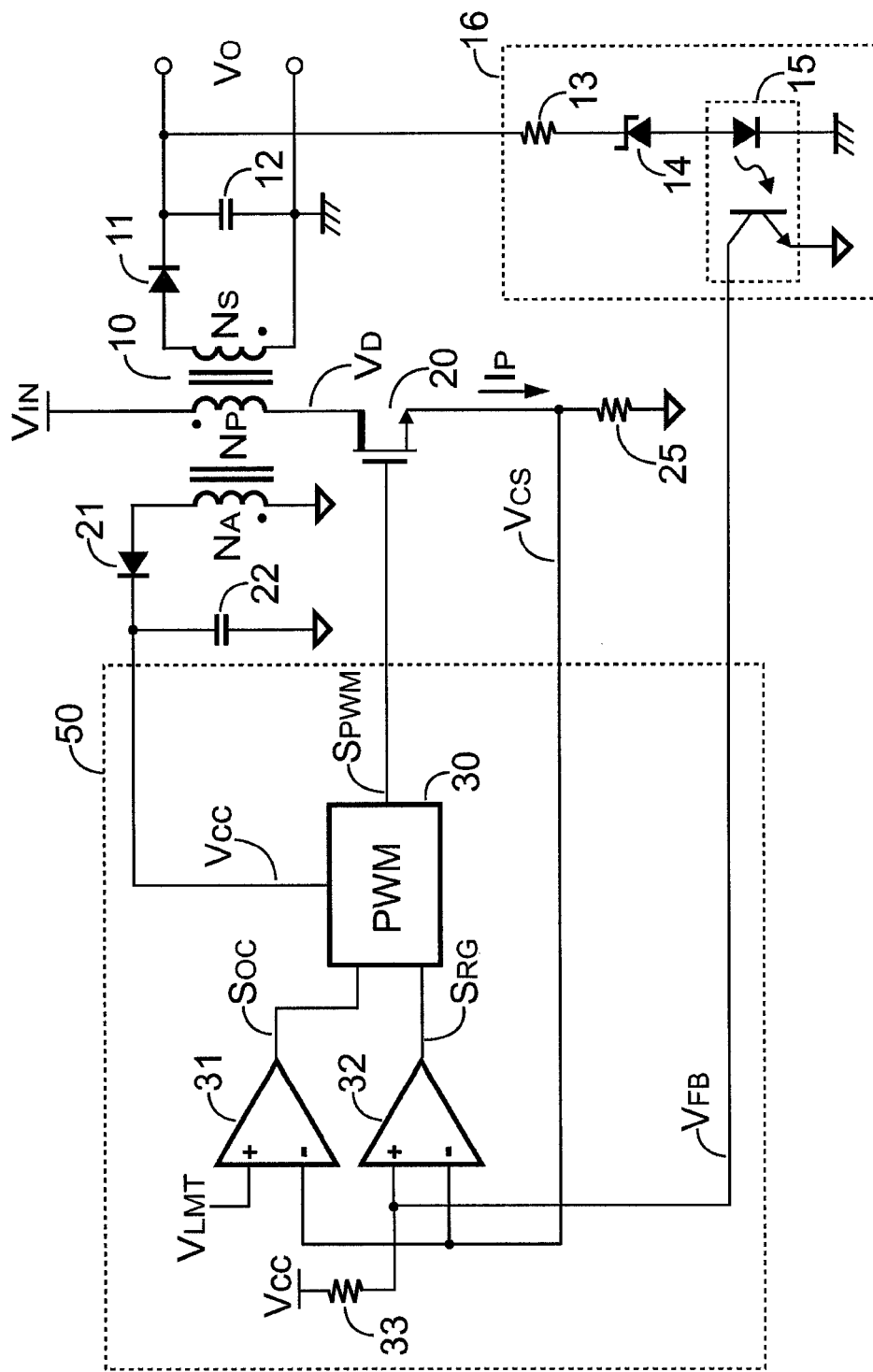
FIG. 1 shows a conventional power converter.
Figure 2:
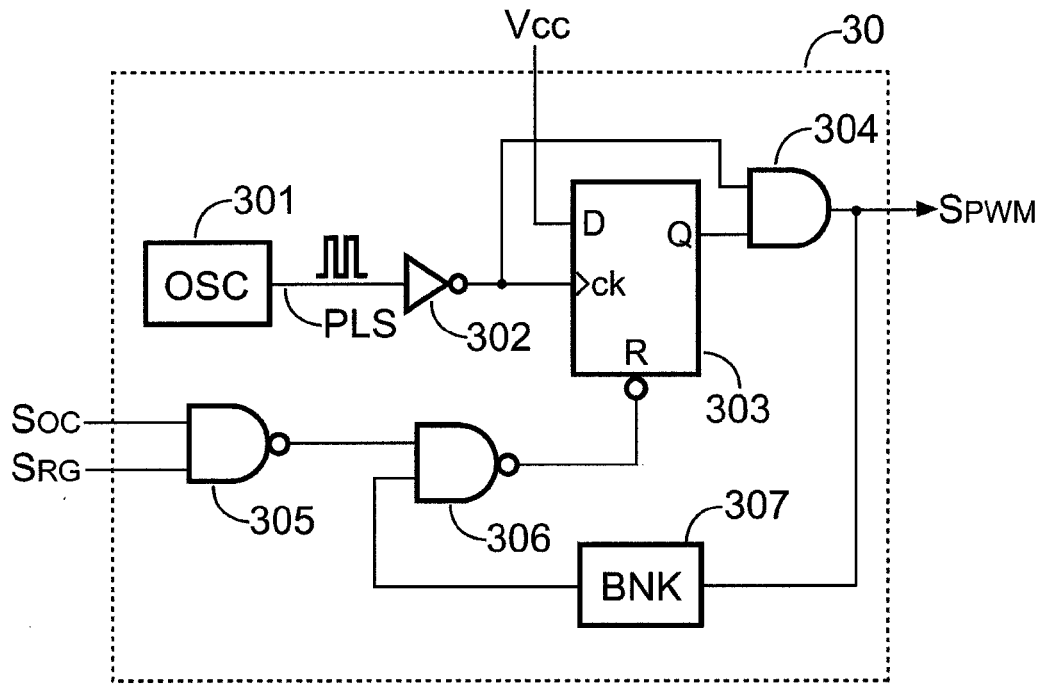
FIG. 2 shows a PWM circuit of the conventional power converter.
Figure 3:
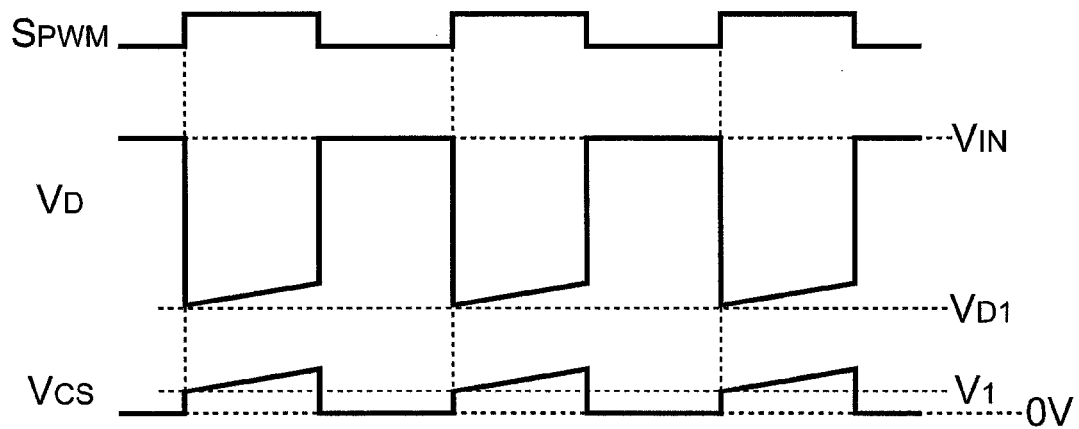
FIG. 3 shows key waveforms of the conventional power converter.
Figure 4:
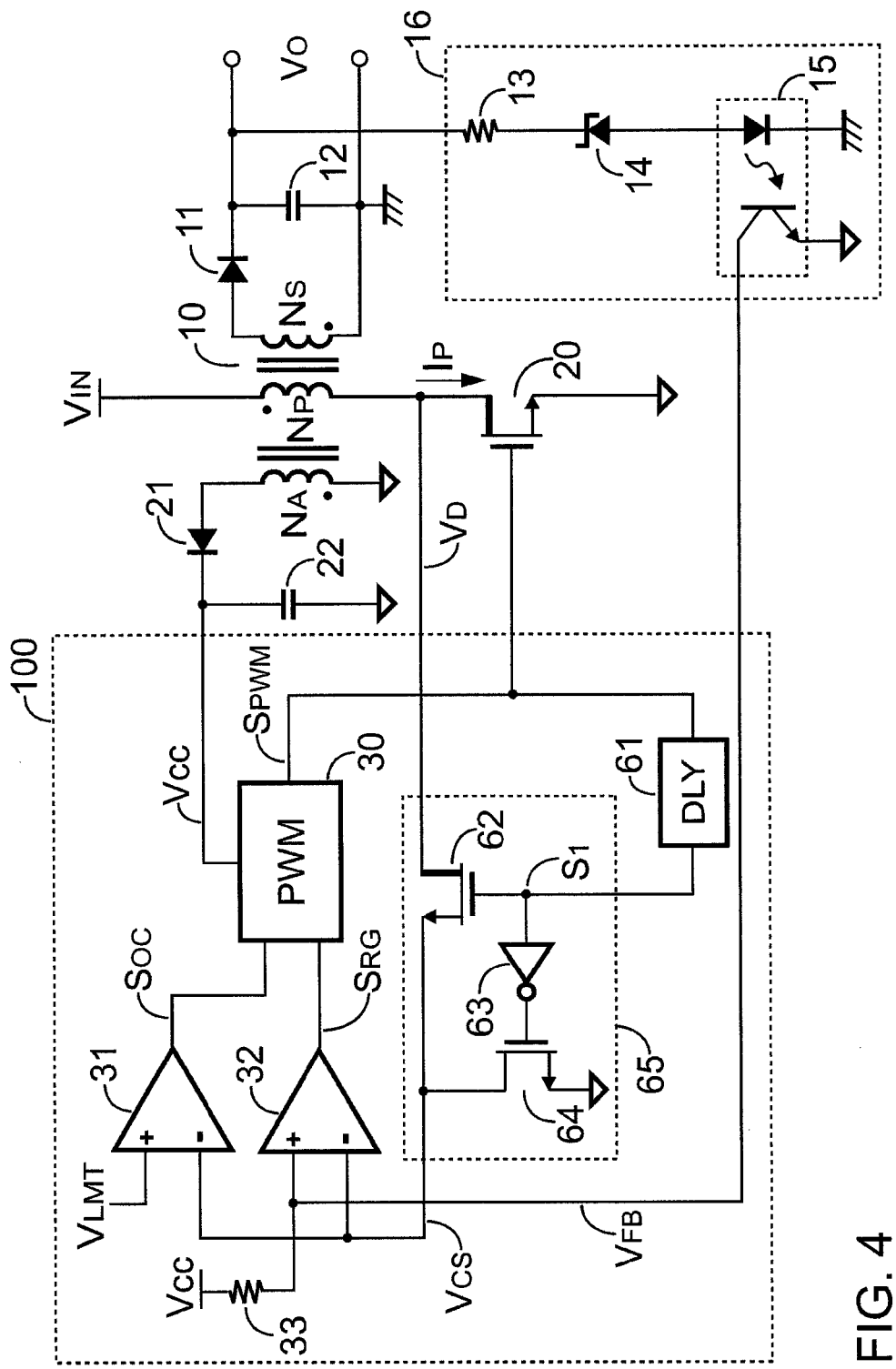
FIG. 4 shows an embodiment of a power converter according to the present invention.

FIG. 4 shows an embodiment of a power converter according to the present invention. The power converter comprises a switching controller 100, a first transistor 20, a transformer 10, diodes 11 and 21, capacitors 12 and 22 and a secondary feedback circuit 16. The switching controller 100 comprises a PWM circuit 30 (PWM), a first comparator 31, a second comparator 32, a current-sense circuit 65 and a delay circuit 61 (DLY).

The current-sense circuit 65 comprises a second transistor 62 and a third transistor 64 and an inverter 63. According to an embodiment of the present invention, transistors 20 and 62 are high-voltage devices, which are, for example, the power switch as aforementioned. The transistors 20, 62 and 64 are regarded as switches. The transformer 10 includes a primary winding $N_P$, an auxiliary winding $N_A$ and a secondary winding $N_S$. A first terminal of the primary winding $N_P$ is supplied with an input voltage $V_{IN}$. A second terminal of the primary winding $N_P$ is connected to a drain of the first transistor 20. A drain voltage $V_D$, which is a high-voltage signal, is obtained at a joint of the second terminal of the primary winding $N_P$ and the drain of the first transistor 20. A source of the first transistor 20 is connected to a primary ground reference. A second terminal of the secondary winding $N_S$ is connected to an anode of the diode 11. A first terminal of the secondary winding $N_S$ is connected to a secondary ground reference. The capacitor 12 is connected between a cathode of the diode 11 and the first terminal of the secondary winding $N_S$. The output voltage $V_O$ is obtained across the capacitor 12.

A first terminal of the auxiliary winding $N_A$ is connected to the primary ground reference. A second terminal of the auxiliary winding $N_A$ is connected to an anode of the diode 21. The capacitor 22 is connected between a cathode of the diode 21 and the primary ground reference. A supply voltage $V_{CC}$ is obtained across the capacitor 22 to power the switching controller 100.

The secondary feedback circuit 16 comprises a resistor 13, a zener diode 14, and an opto-coupler 15. A first terminal of the resistor 13 receives the output voltage $V_O$. A second terminal of the resistor 13 is connected to a cathode of the zener diode 14. An anode of the zener diode 14 is connected to an input of the opto-coupler 15. An output of the opto-coupler 15 is pulled high by a resistor 33 of the switching controller 100. A first terminal of the resistor 33 receives the supply voltage $V_{CC}$. A second terminal of the resistor 33 is connected to the output of the opto-coupler 15. A feedback signal $V_{FB}$ is generated at the output of the opto-coupler 15 in response to the output voltage $V_O$ of the power converter. Therefore, the feedback signal $V_{FB}$ is correlated to the output voltage $V_O$ of the power converter.

An input terminal of the delay circuit 61 and a gate of the first transistor 20 are connected to an output terminal of the PWM circuit 30 for receiving a switching signal $S_{PWM}$. The switching signal $S_{PWM}$ drives the gate, which is a control terminal, of the first transistor 20. An output terminal of the delay circuit 61 generates a delayed switching signal $S_1$ for controlling the current-sense circuit 65 in response to the switching signal $S_{PWM}$. The delayed switching signal $S_1$ drives a gate, which is a control terminal, of the second transistor 62 in response to the switching signal $S_{PWM}$. A drain of the second transistor 62 receives the drain voltage $V_D$. A source of the second transistor 62 is connected to a drain of the third transistor 64, the first comparator 31 and the second comparator 2. A source of the third transistor 64 is connected to the primary ground reference. An output of the inverter 63 is connected to a gate, which is a Control terminal, of the third transistor 64 to control the third transistor 64. An input of the inverter 63 is connected to the gate of the second transistor 62 for receiving the delayed switching signal $S_1$.

A current-sense signal $V_{CS}$ is obtained at the source of the second transistor 62. The current-sense signal $V_{CS}$ is representative of a switching current $I_P$ flowing through the first transistor 20. The current-sense signal $V_{CS}$ is supplied to a negative terminal of the first comparator 31 and a negative terminal of the second comparator 32. A positive terminal of the first comparator 31 is supplied with a current-limit threshold $V_{LMT}$. The current-limit threshold $V_{LMT}$ is utilized to limit a maximum of the switching current $I_P$ flowing through the first transistor 20. A positive terminal of the second comparator 32 is supplied with the feedback signal $V_{FB}$. Once the current-sense signal $V_{CS}$ exceeds the current-limit threshold $V_{LMT}$, the first comparator 31 will generates a first signal $S_{OC}$ to the PWM circuit 30. Once the current-sense signal $V_{CS}$ exceeds the feedback signal $V_{FB}$, the second comparator 32 will generates a second signal $S_{RG}$ to the PWM circuit 30. The PWM circuit 30 generates the switching signal $S_{PWM}$ in response to the first signal $S_{OC}$ and the second signal $S_{RG}$. Therefore, the PWM circuit 30 generates the switching signal $S_{PWM}$ in response to the current-sense signal $V_{CS}$.

Figure 5:
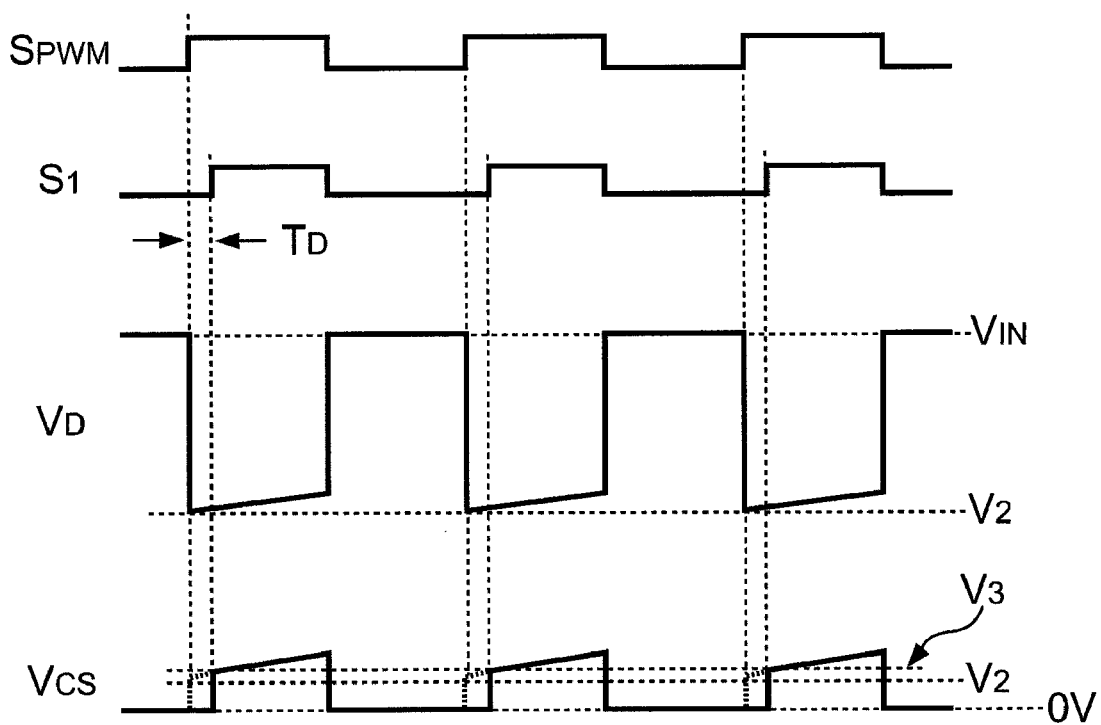
FIG. 5 shows key waveforms of the power converter according to the present invention.

FIG. 5 shows key waveforms of the power converter according to the present invention. Referring to FIG. 4 and FIG. 5, at the instance the switching signal $S_{PWM}$ is just enabled, the first transistor 20 will be turned on. Without current-sense resistor connected in series with the first transistor 20, the drain voltage $V_D$ is pulled down to a voltage level $V_2$. The current-sense signal $V_{CS}$ obtained at the source of the second transistor 62 remains 0 volt until the second transistor 62 is turned on by the delayed switching signal $S_1$. The voltage level $V_2$ can be expressed by:

$$V_2 = I_{P1} \times R_{DSON} \quad (3)$$

Where $I_{P1}$ is an initial value of the switching current $I_P$ flowing through the first transistor 20 as the switching signal $S_{PWM}$ is just enabled; and $R_{DSON}$ is the on-resistance of the first transistor 20.

The delay circuit 61 generates the delayed switching signal $S_1$ in response to the switching signal $S_{PWM}$ after a delay time $T_D$. The delay time $T_D$ inserted between the rising edges of the switching signal $S_{PWM}$ and the delayed switching signal $S_1$ avoids the drain voltage $V_D$ at the instance which the first transistor 20 is being turned off being conducted to the comparators 31 and 32 via the second transistor 62. When the delayed switching signal $S_1$ is enabled, the second transistor 62 will be turned on and the third transistor 64 will be turned off via the inverter 63. As the second transistor 62 is turned on, the drain voltage $V_D$ will be conducted via the second transistor 62 to form the current-sense signal $V_{CS}$ at the source of the second transistor 62. The current-sense signal $V_{CS}$ will start to ramp up with a first slope from a voltage level $V_3$ which is greater than the voltage level $V_2$. The drain voltage $V_D$ also ramps up with a second slope which is equal to the first slope.

When the switching signal $S_{PWM}$ and the delayed switching signal $S_1$ are simultaneously disabled, the transistors 20 and 62 be turned off and the third transistor 64 will be turned on via the inverter 63. As the first transistor 20 is turned off, the drain voltage $V_D$ will be immediately pulled up to the level of the input voltage $V_{IN}$. Meanwhile, since the second transistor 62 is turned off, the drain voltage $V_D$ will not be conducted to the source of the second transistor 62. The current-sense signal $V_{CS}$ will be pulled down to the level of the primary ground reference during the delayed switching signal $S_1$ is disabled.

According to the present invention, the current-sense signal $V_{CS}$ obtained only starts to ramp up when the delayed switching signal $S_1$ is generated. This avoids the drain voltage $V_D$ at the instance which the first transistor 20 is being turned off being conducted into comparators 31 and 32 via the second transistor 62.

Figure 6:
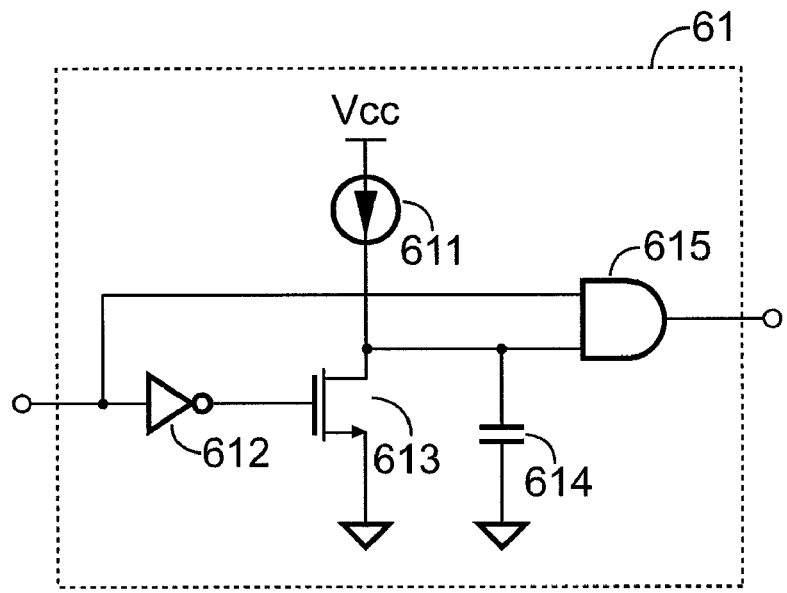
FIG. 6 shows an embodiment of a delay circuit according to the present invention.

FIG. 6 shows an embodiment of the delay circuit 61 according to the present invention. The delay circuit 61 comprises a current source 611, an inverter 612, a transistor 613, a capacitor 614 and an AND gate 615. An input terminal of the delay circuit 61 receives the switching signal $S_{PWM}$ and is connected to an input of the inverter 612 and a first input terminal of the AND gate 615. An output of the inverter 612 is connected to a gate of the transistor 613. A drain of the transistor 613 is connected to a second input terminal of the AND gate 615. The current source 611 is connected between the supply voltage $V_{CC}$ and the drain of the transistor 613. A source of the transistor 613 is connected to the primary ground reference. The capacitor 614 is connected between the drain of the transistor 613 and the primary ground reference. An output of the AND gate 615 is connected to an output terminal of the delay circuit 61 for generating the delayed switching signal $S_1$. Therefore, the delay circuit 61 receives the switching signal $S_{PWM}$ to generate the delayed switching signal $S_1$. The delay time $T_D$ (shown in FIG. 5) is determined by the current magnitude of the current source 611 and the capacitance of the capacitor 614.

It is advantageous that the current-sense circuit 65 and the delay circuit 61 of the present invention eliminate the need of the current-sense resistor 25 in the conventional art to obtain the information of the switching current $I_P$, which also reduces the manufacturing cost and improves the efficiency of the power converter under light-load conditions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims or their equivalents.

What is claimed is:

1. A switching controller for a power converter, comprising:
   a current-sense circuit, receiving a high-voltage signal across a first switch to generate a current-sense signal, wherein said current-sense signal is representative of a switching current flowing through said first switch;
   a first comparator, receiving a current-limit threshold and said current-sense signal for generating a first signal when said current-sense signal exceeding said current-limit threshold, wherein said current-limit threshold is utilized to limit a maximum of said switching current flowing through said first switch;
   a second comparator, receiving a feedback signal and said current-sense signal, wherein said second comparator generates a second signal when said current-sense signal exceeds said feedback signal, wherein said feedback signal is correlated to an output voltage of said power converter;

a PWM circuit, coupled to said first comparator and said second comparator for generating a switching signal in response to said first signal and said second signal; and a delay circuit, receiving said switching signal to generate a delayed switching signal, wherein said switching signal generated by said PWM circuit drives a control terminal of said first switch.

2. The switching controller as claimed in claim 1, said current-sense circuit comprising:

a second switch, coupled to said first switch for receiving said high-voltage signal, wherein a control terminal of said second switch is driven by said delayed switching signal generated by said delay circuit;

a third switch, coupled to said second switch, said first comparator and said second comparator; and an inverter, receiving said delayed switching signal generated by said delay circuit for controlling a control terminal of said third switch.

3. The switching controller as claimed in claim 2, wherein said first switch and said second switch are high-voltage transistors.

4. The switching controller as claimed in claim 2, wherein said current-sense signal and said high-voltage signal ramp up with the same slope during enabling of said delayed switching signal generated by said delay circuit.

5. The switching controller as claimed in claim 2, wherein said third switch will be turned on to pull down said current-sense signal to a level of a ground reference during disabling of said delayed switching signal generated by said delay circuit.

6. The switching controller as claimed in claim 2, wherein a delay time provided by said delay circuit avoids said high-voltage signal at the instance which said first switch is being turned off being conducted into said first comparator and said second comparator via said second switch.

7. A switching controller for a power converter, comprising:

a current-sense circuit, receiving a high-voltage signal across a first switch to generate a current-sense signal, wherein said current-sense signal is representative of a switching current flowing through said first switch;

a PWM circuit, generating a switching signal in response to said current-sense signal, wherein said switching signal drives said first switch; and a delay circuit, receiving said switching signal to generate a delayed switching signal for controlling said current-sense circuit.

8. The switching controller as claimed in claim 7, further comprising:

a first comparator, receiving a current-limit threshold and said current-sense signal for generating a first signal when said current-sense signal exceeding said current-limit threshold, wherein said current-limit threshold is utilized to limit a maximum of said switching current flowing through said first switch; and a second comparator, receiving a feedback signal and said current-sense signal, wherein said second comparator generates a second signal when said current-sense signal exceeds said feedback signal, wherein said feedback signal is correlated to an output voltage of said power converter;

wherein, said PWM circuit generates said switching signal in response to said first signal and said second signal.

9. The switching controller as claimed in claim 7, wherein said current-sense signal will be pulled down to a level of a ground reference during disabling of said delayed switching signal generated by said delay circuit.

10. The switching controller as claimed in claim 7, said current-sense circuit comprising:

a second switch, coupled to said first switch for receiving said high-voltage signal, wherein said second switch is driven by said delayed switching signal generated by said delay circuit;

a third switch, coupled to said second switch; and an inverter, receiving said delayed switching signal generated by said delay circuit for controlling said third switch.

11. The switching controller as claimed in claim 10, wherein said third switch will be turned on to pull down said current-sense signal to a level of a ground reference during disabling of said delayed switching signal generated by said delay circuit.

12. The switching controller as claimed in claim 10, wherein said second switch is a high-voltage transistor.

13. The switching controller as claimed in claim 7, wherein said delay circuit provides a delay time, said delay time is inserted between the rising edges of said switching signal generated by said PWM circuit and said delayed switching signal generated by said delay circuit.

14. The switching controller as claimed in claim 7, wherein said current-sense signal and said high-voltage signal ramp up with the same slope during enabling of said delayed switching signal generated by said delay circuit.

15. The switching controller as claimed in claim 7, wherein said first switch is a high-voltage transistor.

* * * * *